United States Patent [19]
Hwang

[11] Patent Number: 5,803,410
[45] Date of Patent: Sep. 8, 1998

[54] SKIN FRICTION REDUCTION BY MICRO-BLOWING TECHNIQUE

[75] Inventor: Danny P. Hwang, Strongsville, Ohio

[73] Assignee: The United States of America as represented by the Administrator of the National Aeronautics and Space Administration, Washington, D.C.

[21] Appl. No.: 566,211

[22] Filed: Dec. 1, 1995

[51] Int. Cl.⁶ .......................... B64C 21/04; B64C 21/06
[52] U.S. Cl. ...................... 244/208; 244/207; 114/67 A
[58] Field of Search .................... 244/207, 208, 244/209, 130; 114/67 A

[56] References Cited

U.S. PATENT DOCUMENTS

| | | | |
|---|---|---|---|
| 280,913 | 7/1883 | De Laval | 114/67 A X |
| 2,742,247 | 4/1956 | Lachmann | 244/130 |
| 3,010,680 | 11/1961 | Kaplan | 244/207 |
| 3,040,688 | 6/1962 | Gram | 114/67 A |
| 3,128,973 | 4/1964 | Dannenberg | 244/130 |
| 3,194,518 | 7/1965 | Walsh | 244/207 X |
| 3,421,577 | 1/1969 | Valyi | 244/208 X |
| 3,604,661 | 9/1971 | Mayer . | |
| 3,732,839 | 5/1973 | Schuster et al. . | |
| 4,749,150 | 6/1988 | Rose et al. . | |
| 4,802,642 | 2/1989 | Mangiarotty . | |
| 4,932,610 | 6/1990 | Maestrello . | |
| 4,932,612 | 6/1990 | Blackwelder et al. . | |
| 5,031,559 | 7/1991 | Bartholomew | 114/67 A |
| 5,117,882 | 6/1992 | Stanford | 114/67 A |
| 5,236,155 | 8/1993 | Hrach . | |
| 5,263,667 | 11/1993 | Horstman . | |
| 5,591,511 | 1/1997 | Yasui | 244/208 X |

FOREIGN PATENT DOCUMENTS

| | | | |
|---|---|---|---|
| 408457 | 4/1934 | United Kingdom | 244/207 |

*Primary Examiner*—William Grant
*Attorney, Agent, or Firm*—Kent N. Stone; Susan D. Reinecke

[57] ABSTRACT

A system and method for reducing skin friction of an object in relative motion to a fluid. A skin forming a boundary between the object and the fluid, the skin having holes through which micro-blowing of air is blown and a transmitting mechanism for transmitting air through the skin. The skin has an inner layer and an outer layer, the inner layer being a low permeable porous sheet, the outer layer being a plate having high aspect ratio high porosity, and small holes. The system may further include a suction apparatus for suctioning air from the outer layer. The method includes the steps of transmitting air through the inner layer and passing the air transmitted through the inner layer to the outer layer. The method may further include the step of bleeding air off the outer layer using the suction apparatus.

19 Claims, 11 Drawing Sheets

SKIN FRICTION REDUCTION BY MICRO-BLOWING TECHNIQUE

ORIGIN OF THE INVENTION

The invention described herein was made by an employee of the U.S. Government and may be manufactured or used by or for the U.S. Government for governmental purposes without the payment of any royalties thereon or therefore.

BACKGROUND OF THE INVENTION

I. Field Of The Invention

This invention pertains generally to a method and apparatus for reducing skin friction of an aircraft or a watercraft, and more specifically to a porous skin applied to the outside of the craft with air, or water, blown vertically through the skin to control the gradient of the flow velocity profile on the surface and to reduce the roughness of the skin for reducing skin friction.

II. Description Of The Related Art

One of the key parameters in aircraft efficiency is low skin friction drag. In the past, attempts were made to use blowing techniques to reduce skin friction of aircraft and watercraft. The previous attempts resulted, however, in skin combinations that actually increased drag force. Other methods of reducing skin friction have included making modifications to the shape of the skin to reduce drag forces. All of these methods have resulted in minimal to non-existent reductions in skin friction.

The present invention contemplates a new and improved method and apparatus for reducing skin friction of an aircraft or a watercraft which is simple in design, effective in use, and overcomes the foregoing difficulties and others while providing better and more advantageous overall results.

SUMMARY OF THE INVENTION

In accordance with the present invention, a new and improved method and apparatus for reducing skin friction on an aircraft or a watercraft is provided which reduces the skin friction when the aircraft or watercraft is in motion using a micro-blowing technique. Air is blown on an aircraft, and water is blown on a watercraft. The term "micro-blowing" is herein defined as the blowing of a small amount of air blown perpendicularly to the surface in question to control the gradient of the flow velocity profile and to reduce the roughness of the skin, thereby reducing skin friction.

More particularly, in accordance with the present invention, the system for reducing skin friction of the craft or object in relative motion to a fluid includes a skin forming a boundary between the craft and the fluid, the skin having holes through which air is blowable, and transmitting means for transmitting air through the skin.

According to one aspect of the present invention, the method includes the steps of transmitting air through the inner layer and passing the air blown through the inner layer through the outer layer.

One advantage of the present invention is that skin friction may be reduced by 20% to 30% utilizing the micro-blowing technique.

Another advantage of the present invention is that the micro-blowing does not cause the boundary layer between the air mass and the skin to grow.

Another advantage of the present invention is that the transmitting rate may be adjusted to change the degree of skin friction reduction.

Another advantage of the present invention is that the adjustments to the degree of skin friction reduction may be applied to the control of the aircraft.

Another advantage of the present invention is that the micro-blowing prevents foreign objects from lodging in the holes of the aircraft.

Another advantage of the present invention is that excess buildup of the boundary layer may be bled off of the surface in question by using suction.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
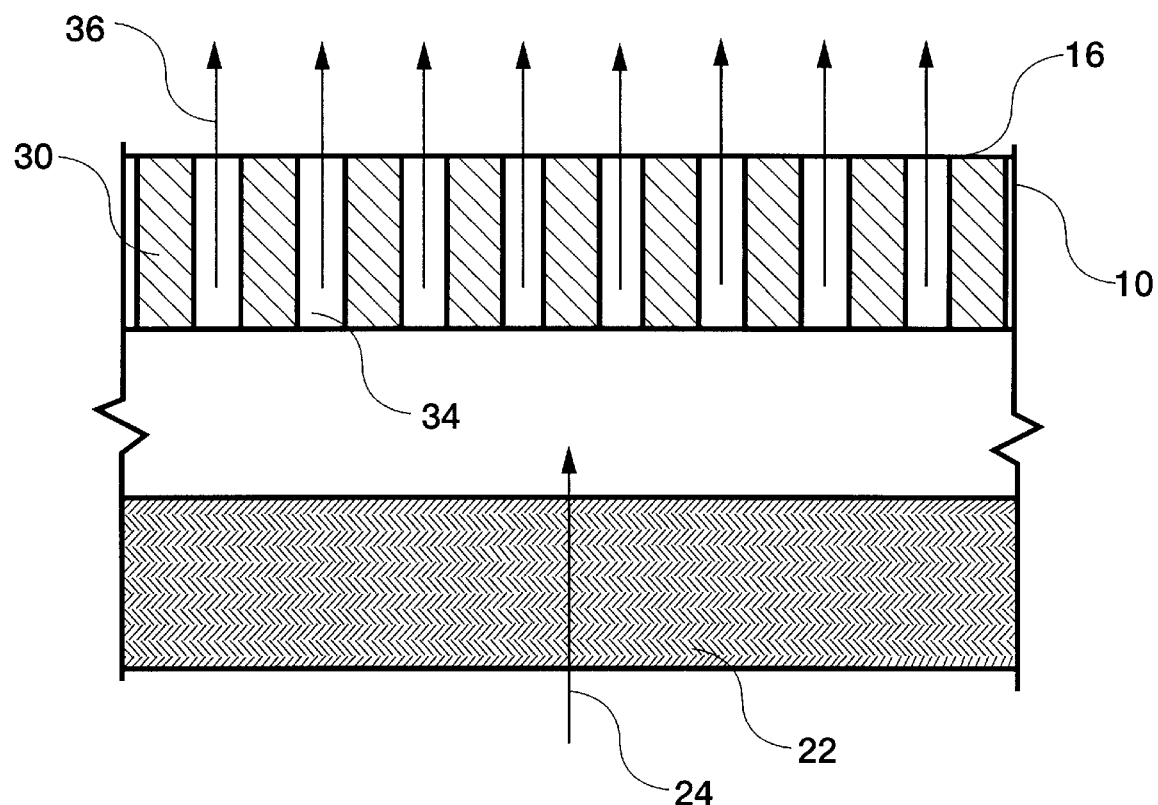
FIG. 1 shows a cross-sectional side view of a skin showing the micro-blowing process.

Referring now to the drawings, which are for purposes of illustrating a preferred embodiment of the invention only, and not for purposes of limiting the invention, FIG. 1 is a cross-sectional side view of a skin 10 according to the invention. The skin 10 is preferably built into an outer surface (not shown) of an aircraft, watercraft, or other object designed to pass through a fluid. While the skin 10 is preferably built into the outer surface of the object during the construction of the object, it is possible for the skin 10 to be retrofitted to an existing object, such as an aircraft.

Skin friction and drag occur when an object passes through a first fluid, such as water or air. With continuing reference to FIG. 1, in order to reduce skin friction on an outer surface 16 of the skin 10, a second fluid is blown first through an inner layer 22 of the skin 10 in the direction of arrow 24. Depending on the application, any fluid will work, but for the purposes of this disclosure the invention will be described with reference to an aircraft and the first and second fluids will be air.

The inner layer 22 is preferably made of a low permeability porous plate. At the present time, the preferred material is 30 microns porous high density polyethylene. In the tested configuration, the thickness of the inner layer 22 was about 0.25 inches but it is believed that acceptable performance can be obtained with significantly smaller dimensions. The purpose of the inner layer 22 is to control the low airflow rate required to reduce skin friction and to evenly distribute the flow to the outer layer 30.

The outer layer 30 is made of a high porosity plate with high aspect ratio holes 34. Tested configurations of the outer layer 30 ranged from 0.006 inches to 0.04 inches thick. The outer layer 30 is presently made of stainless steel although stainless steel may be too dense for some applications where weight is a constraint. Lighter materials which otherwise provide equivalent performance are preferred. One preferred material is commercially available from the Northrup Grumman Corporation under the code GAC1897.

The term "aspect ratio" means the ratio of the length of the holes 34 to the diameter of the holes 34. The tested outer layers 30 had holes 34 with diameters ranging from 0.00236 inches to 0.015 inches. The aspect ratios ranged from 1.7 to 6.20.

The outer layer 30 controls and directs the flow of the second fluid, in the direction of the arrows 36, through the outer surface 16. It is important that the second fluid be directed substantially normal, or perpendicularly to the outer surface 16 of the skin 10. The second fluid may be blown using a fan or any other transmitting device that can control the rate at which the second fluid is blown. Slightly slanted holes 34 with respect to a perpendicular line may also work.

The density and size of the holes 34 determine the porosity of the configuration. Porosity in the tested configurations ranged from 4% to 31% porosity, meaning the tested outer layer had 4% to 31% open area.

Figure 2:
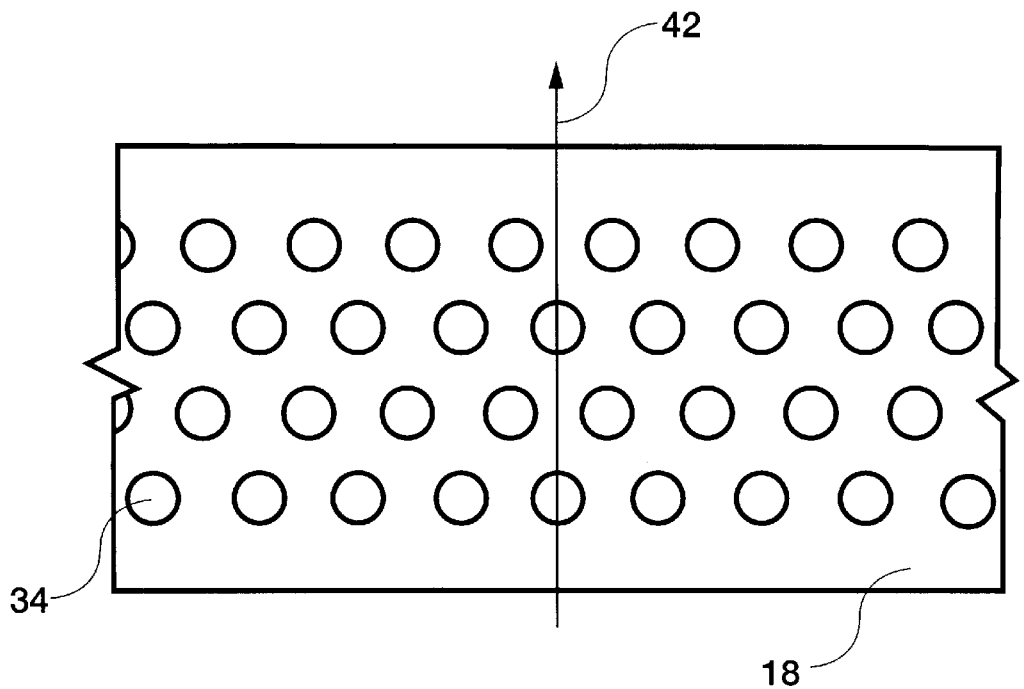
FIG. 2 shows a top view of the surface of FIG. 1.

FIG. 2 is a view directed normal to the outer surface 16 of the skin 10. The holes 34 are preferably in a honeycomb configuration. Other types of configurations may also be used. The holes 34 may be laser drilled, and it is not important that the holes 34 be perfectly round. The holes need not be drilled; other methods of providing the desired aspect ratio holes will work. The flow of the first fluid is in the direction of arrow 42. The honeycomb configuration of the holes 34 ensures that the entire outer surface 16 has coverage of the second fluid.

With reference to FIGS. 3–9, the calculations were computed using the best available mathematical models of airflow about a surface. The data is presented to show the theoretical foundations and the trend that the present invention reduces skin friction. The concepts were subsequently verified and proven experimentally, as evidenced by the data found in FIGS. 10–13.

Figure 3:
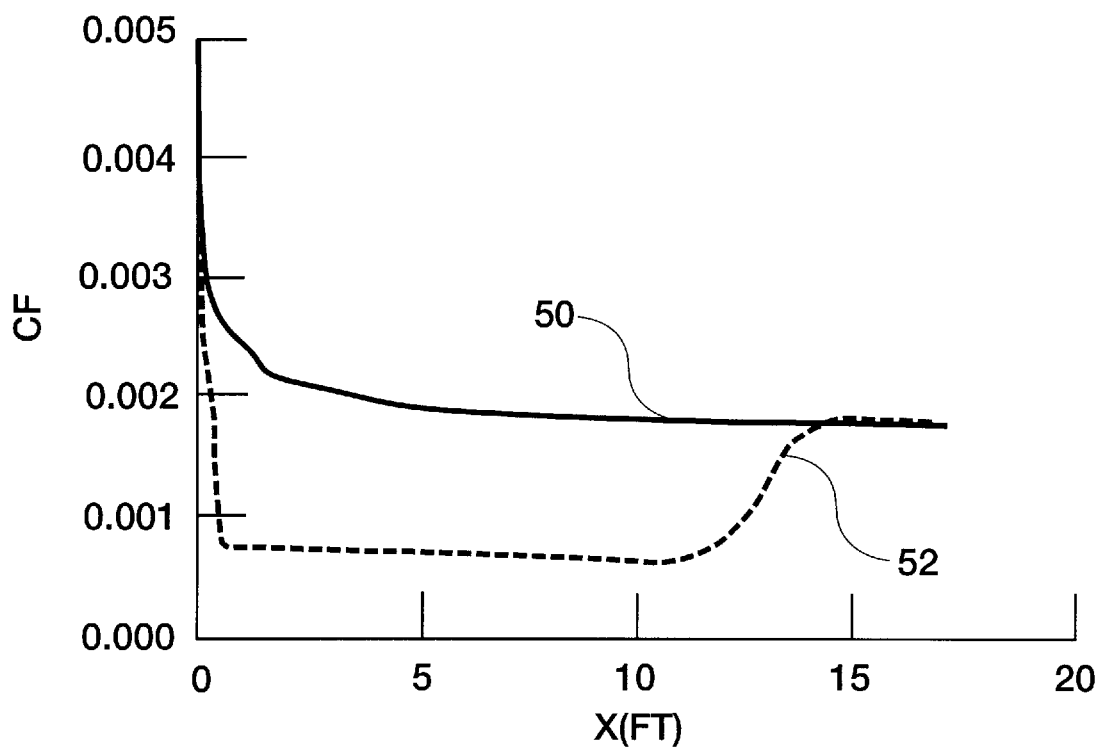
FIG. 3 shows a graph of micro-blowing computational results discussed more fully elsewhere in this disclosure.

FIG. 3 shows a graph of results of a computation of this principle applied to a flat plate. The solid line 50 is the graph of the coefficient of friction with respect to distance without the benefit of the inventive transmitting of the second fluid to the outer surface 16. The dotted line 52 represents the coefficient of friction with the inventive transmitting technique. The flow of the second fluid in a direction as indicated in FIG. 1 was initiated at x=0.195 ft. The transmitting technique reduces the coefficient of friction of the skin 10 from approximately 0.002 to approximately 0.00075, a significant reduction of 60%, with the second fluid transmitting at a vertical flow velocity of just 0.056 ft/sec. The vertical flow was terminated at x=12.68 ft, and the skin friction coefficient along the dotted line 52 returned to the same level as that without transmitting.

Figure 4:
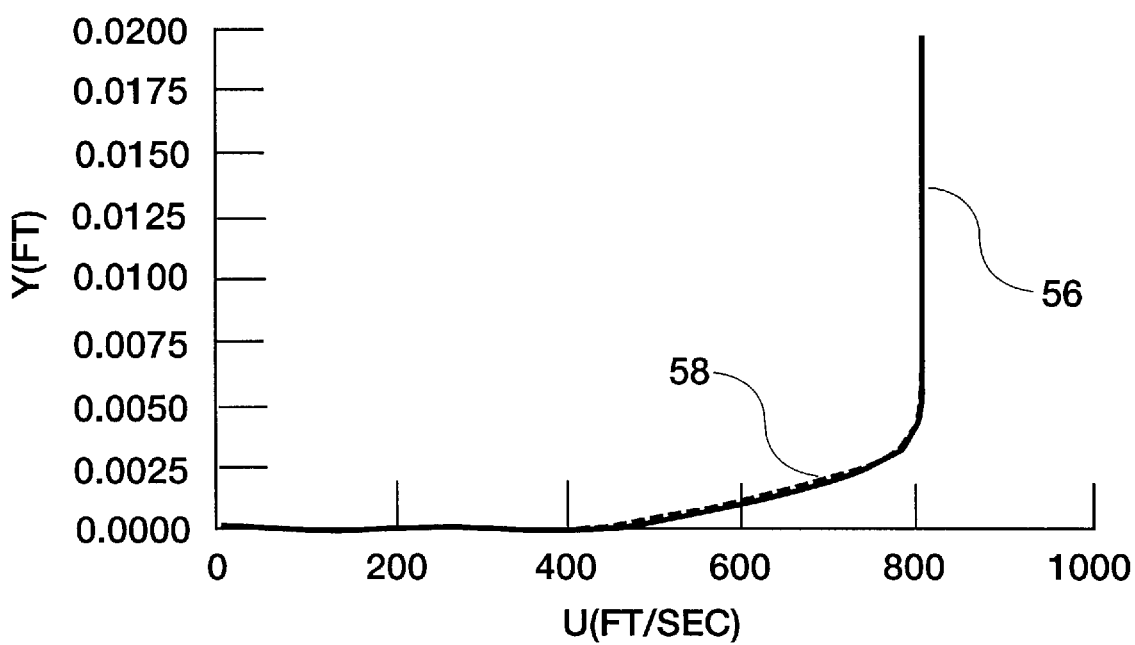
FIG. 4 shows a graph of a velocity profile before micro-blowing.
Figure 5:
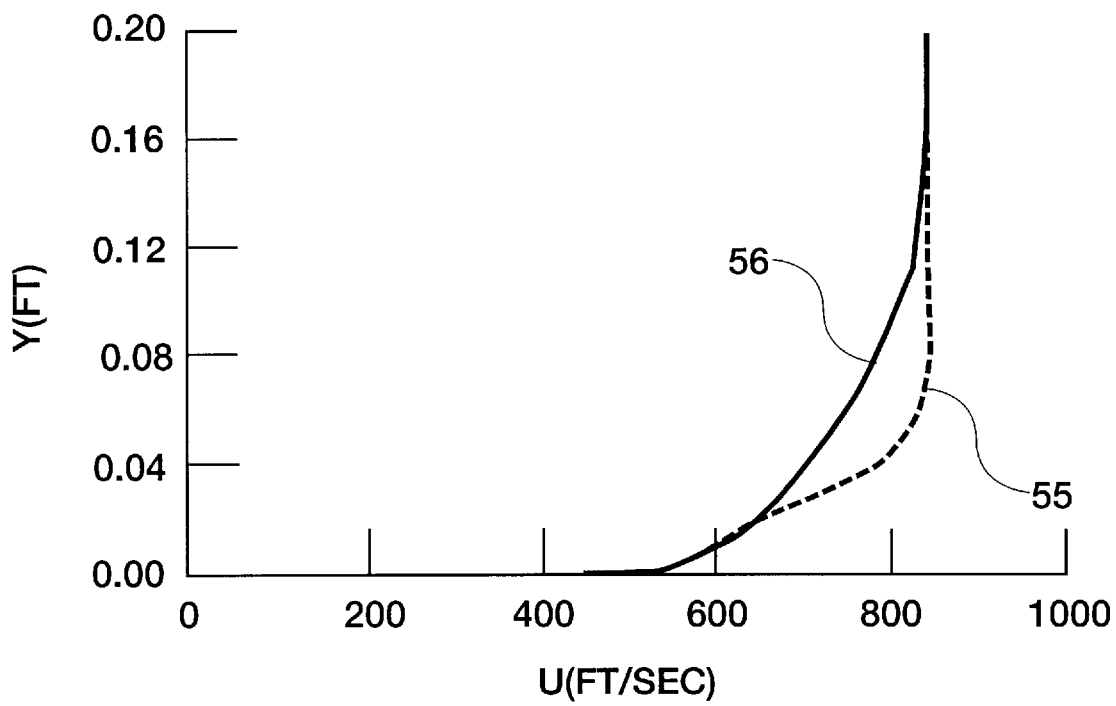
FIG. 5 shows a graph of a velocity profile during micro-blowing.

With reference to FIGS. 4 and 5, FIG. 4 shows velocity profiles before the vertical flow, as described above, was applied, and FIG. 5 shows velocity profiles near the end of the micro-blowing section. The two graphs measure the height of the boundary layer with respect to the outside airflow velocity. At a point before the micro-blowing section, x=0.17 ft, the profiles for the height of the boundary layer are equal for the two trials, as pointed out by the graph in FIG. 4, where the solid line 56 represents boundary layer height with no transmitting, and the dotted line 58 represents the boundary layer height with transmitting. However, the boundary layer grows less when measured in the micro-blowing section, at x=10.95 ft, the height of the boundary layer being represented by the dotted line 58 in FIG. 5, than when there is no transmitting, represented on the graph by the solid line 56. The reduction of growth in the boundary layer with the micro-blowing is probably attributable to a reduction in skin friction.

It is important to note that if a large amount of vertical airflow is applied, increased boundary layer thickness may result. A low level vertical airflow, such as the flow of 0.056 ft/sec applied in the computation, is essential for micro-blowing to reduce skin friction.

Figure 6:
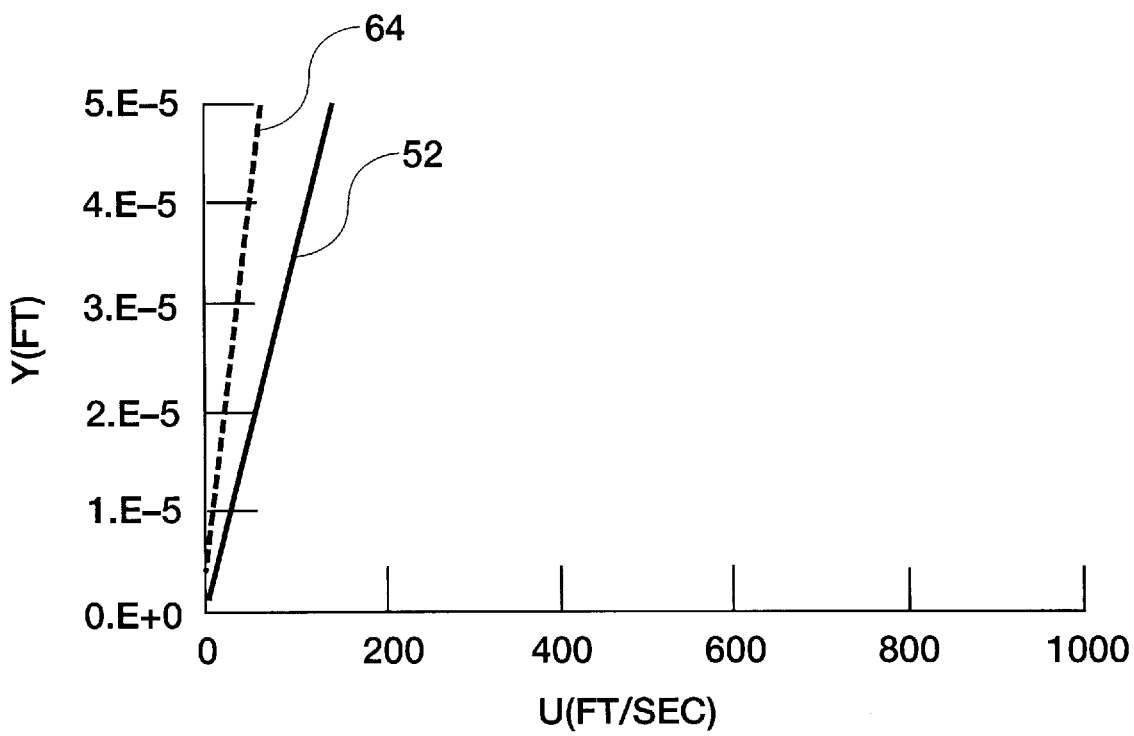
FIG. 6 shows a graph of a velocity gradient.

FIG. 6 shows the velocity gradients, or the derivatives of u with respect to y, for the case where there is no transmitting, represented by the solid line 62, and transmitting, represented by the dotted line 64. Though the two curves 56, 58 from FIG. 5 look identical at the surface near y=0, FIG. 6 shows that the velocity gradient of the case with transmitting 64 is smaller than the velocity gradient of the case without transmitting 62. In theory, the gradient of the velocity profile should be close to zero if the second fluid is blown perfectly normal to the surface. In this application, the vertical transmitting second fluid is applied only at discrete holes 34 (see FIG. 2), therefore the efficiency of the micro-blowing skin 10 (see FIG. 1) might be slightly less than predicted values.

Figure 7:
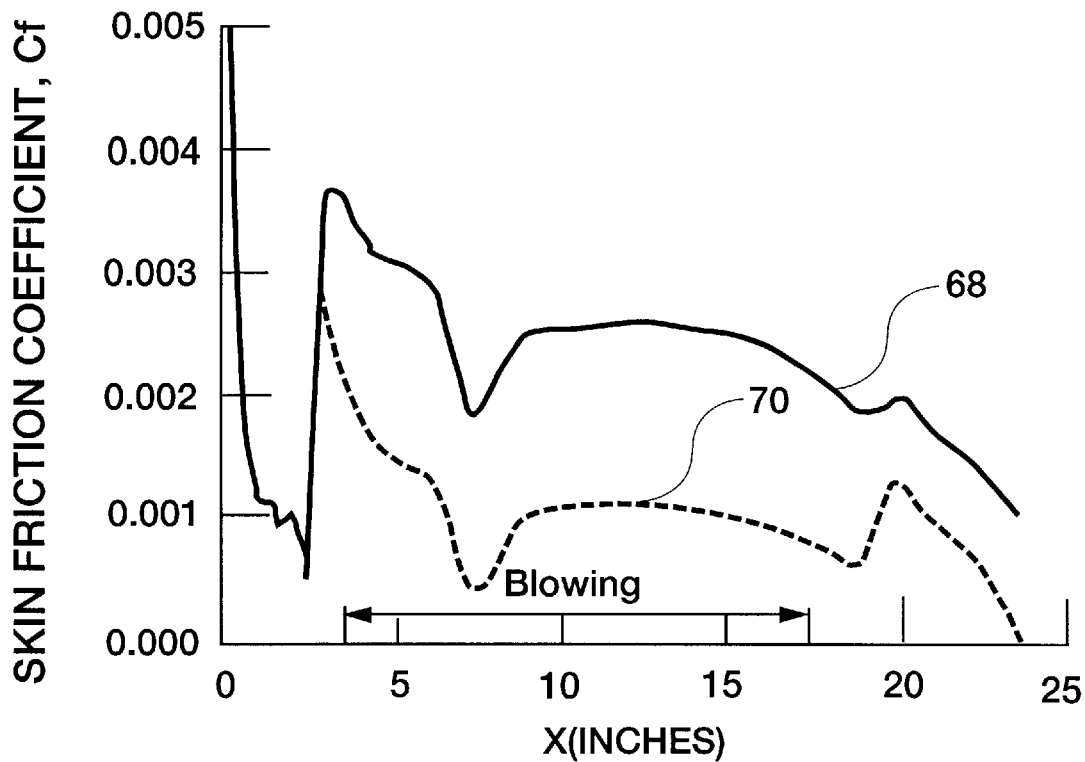
FIG. 7 shows a graph of the skin friction of an advance ducted propeller (ADP) nacelle with micro-blowing.
Figure 8:
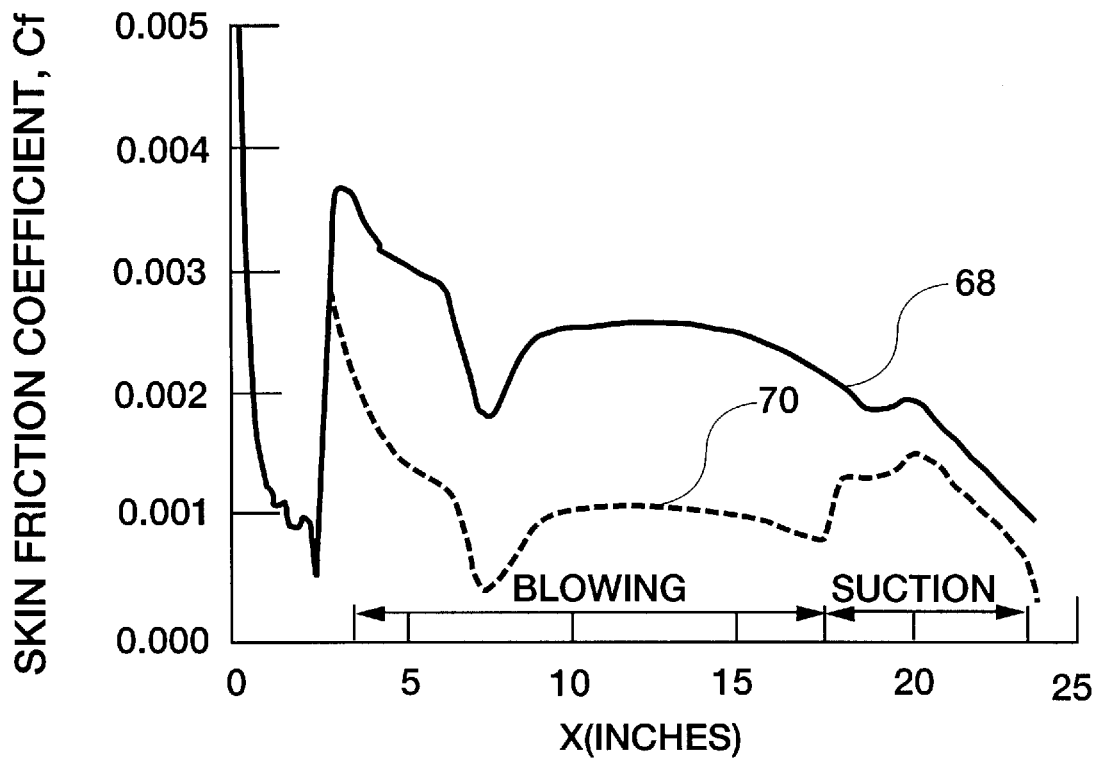
FIG. 8 shows a graph of skin friction of an advance ducted propeller (ADP) nacelle with micro-blowing and suction.
Figure 9:
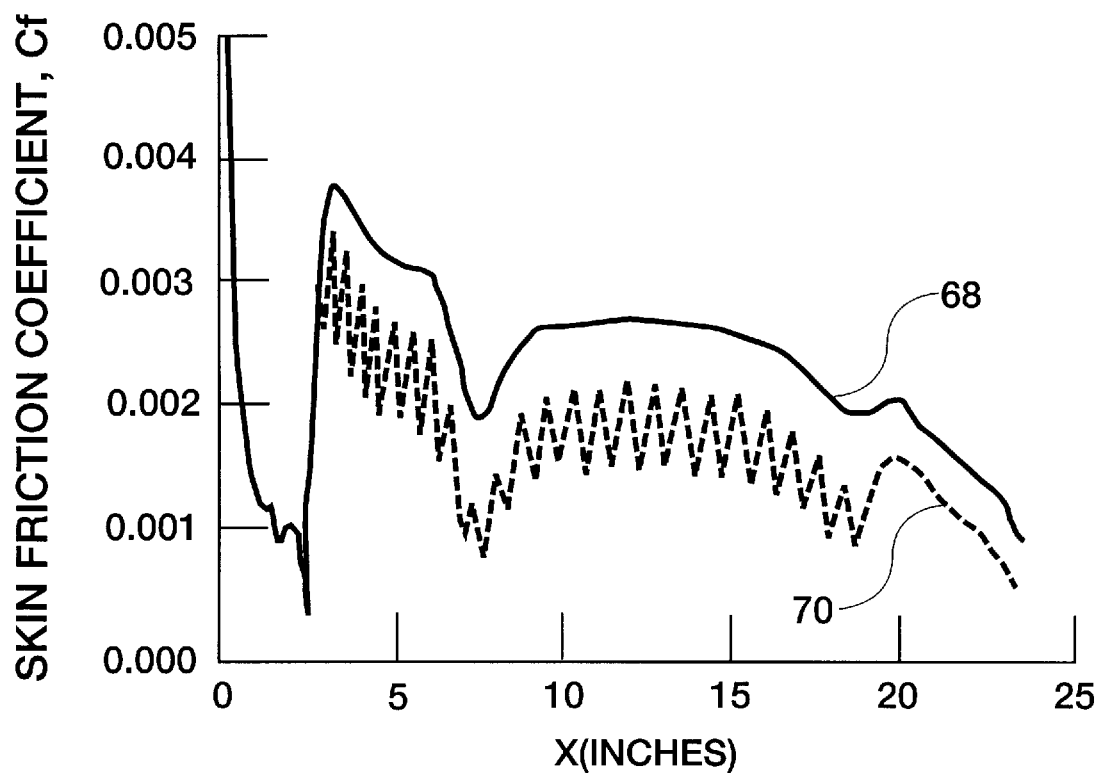
FIG. 9 shows a graph of skin friction of an advance ducted propeller (ADP) nacelle with discrete holes.

With reference to FIGS. 7, 8, and 9, the skin friction coefficient of an advanced ducted propeller (ADP) nacelle was calculated using an Euler solution from PARC2D and Herrings's boundary layer program. A reduction of 60% in skin friction was achieved with the transmitting rate of 0.1024 lbm/sq ft/sec as shown in FIG. 7 where the solid line 68 is skin friction without transmitting, and the dotted line 70 is skin friction with transmitting. The skin friction coefficients were all positive except at the trailing edge where the skin coefficient was equal to zero. If the transmitting rate was higher, a separation region should appear near the trailing edge. This implies that the maximum reduction in skin friction for an ADP nacelle is about 60%. In practical application, suction boundary layer control can be applied near the trailing edge to prevent flow separation, and the suction air can be reused for micro-blowing application as shown in FIG. 8. A pattern of discrete holes 34 (see FIG. 2) with 23% porosity reduces efficiency slightly, as shown in FIG. 9, however, the overall reduction in skin friction of 35% is very attractive.

Figure 10:
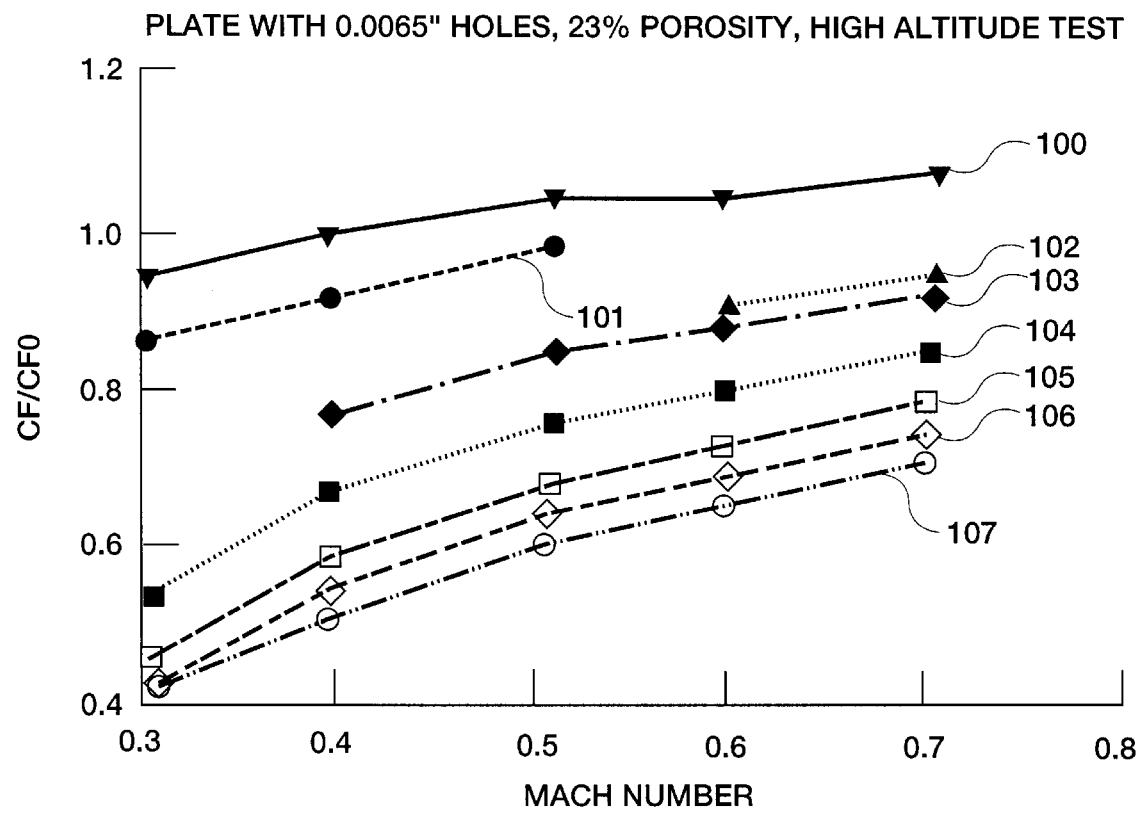
FIG. 10 shows skin friction coefficient ratios of a preferred embodiment of the invention.

FIG. 10 shows the test results of a preferred embodiment of the invention. The holes 34 (see FIG. 2) have a diameter of 0.0065", and the skin has a porosity of 23%. The skin was tested at a number of mach number levels (ratio of the outside airflow velocity to the speed of sound) and a number of transmitting rates. The results were graphed as a function of skin friction coefficient divided by the skin friction coefficient of a flat plate without holes. The skin friction coefficient is defined as the skin friction force divided by the product of one half of the free stream density and the free stream velocity squared. Line 100 corresponds to a transmitting rate of 0 lbm/sec/sq ft, line 101 to a transmitting rate of 0.0039 lbm/sec/sq ft, line 102 to a transmitting rate of 0.011 lbm/sec/sq ft, line 103 to a transmitting rate of 0.0135 lbm/sec/sq ft, line 104 to a transmitting rate of 0.021 lbm/sec/sq ft, line 105 to a transmitting rate of 0.03 lbm/sec/sq ft, line 106 to a transmitting rate of 0.036 lbm/sec/sq ft, and line 107 to a transmitting rate of 0.042 lbm/sec/sq ft. As can be seen, the about 60% to 70% of reduction in skin friction is obtained in the first 50% of micro-blowing, lines 101, 102, 103, and 104, with the best results being obtained by a transmitting rate of 0.042 lbm/sec/sq ft, line 107, the maximum amount tested. At the transmitting rate of 0.042 lbm/sec/sq ft, a 28% reduction in skin friction was obtained at a mach number level of 0.7. Decreasing the transmitting rate led to increases of skin friction at corresponding mach number levels. Optimal transmitting rates may differ for different portions of a craft, such as on an airfoil which has rounded surfaces and varying levels of pressure. A transmitting rate of 0 lbm/sec/sq ft, line 100, led to increased skin friction, as is evident on the graph. The plates tested were made of stainless steel, however, other lighter weight materials may be used.

Figure 11:
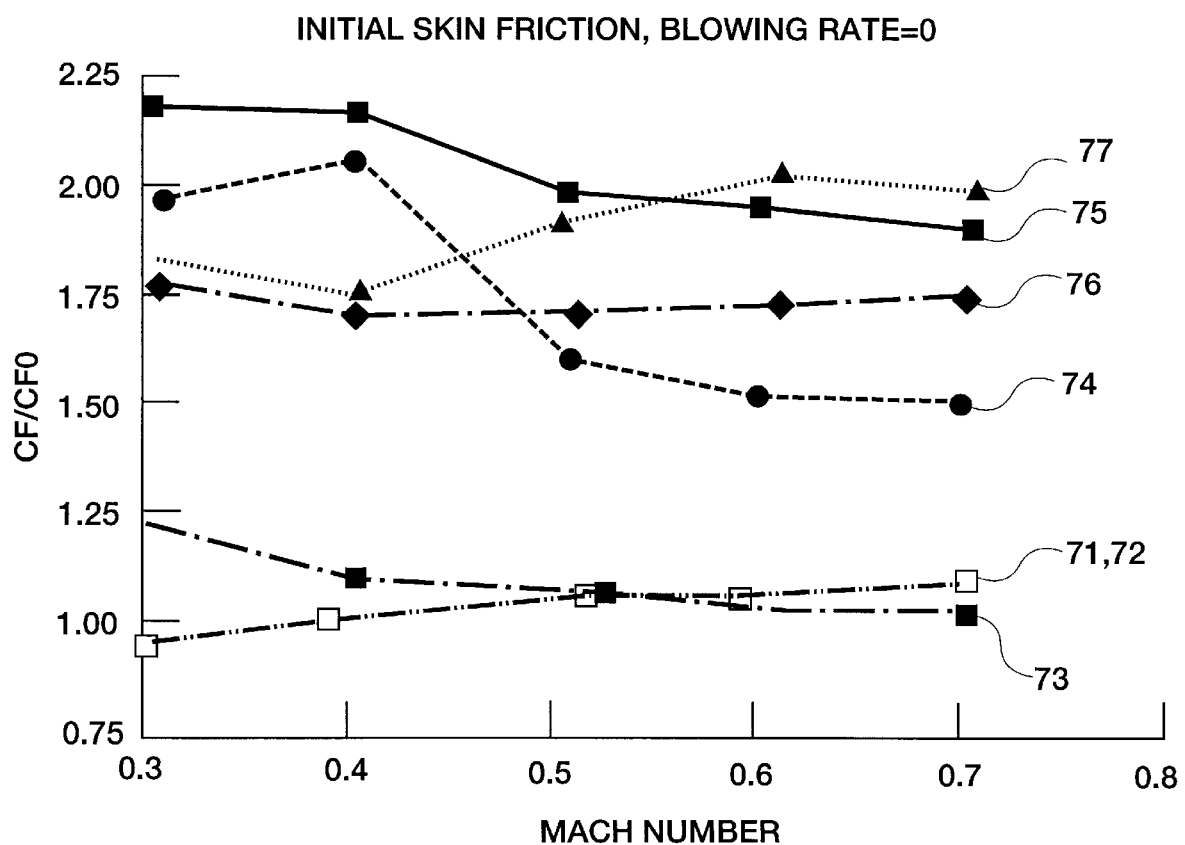
FIG. 11 shows skin friction coefficient ratios of a variety of test plates with varying aspect ratios.

FIG. 11 shows initial skin friction for several porous plates, with the graph showing initial skin friction coefficients with no transmitting for the porous plates divided by the skin friction coefficient of a flat plate without holes at various mach number levels. Line 71 is a plate with an aspect ratio of 6.2, line 72 is a plate with an aspect ratio of 4, line 73 is a plate with an aspect ratio of 5, line 74 is a plate with an aspect ratio of 2, line 75 is a plate with an aspect ratio of 1.7, line 76 is is another plate with an aspect ratio of 2, and line 77 is yet another plate with an aspect ratio of 2. The plates with the low aspect ratios, plate thickness divided by hole diameter, lines 74, 75, 76, and 77 had high initial skin friction. The high initial friction eliminates these plates as micro-blowing skin 10 (see FIG. 1) because they must overcome the initial increased skin friction before yielding a benefit over a standard flat plate. However, the plates with high aspect ratios, aspect ratios greater than 4.0, represented by lines 71, 72, and 73 had low initial skin friction, and thus quickly yielded better results than a flat plate when micro-blowing was applied. It has been experimentally determined that an aspect ratio of about 4.0 is the minimum level needed for successful micro-blowing, however, new plate or hole combinations may result in the use of lower aspect ratio plates in the future. Any low initial skin friction porous plate even without holes may be used for micro-blowing.

Figure 12:
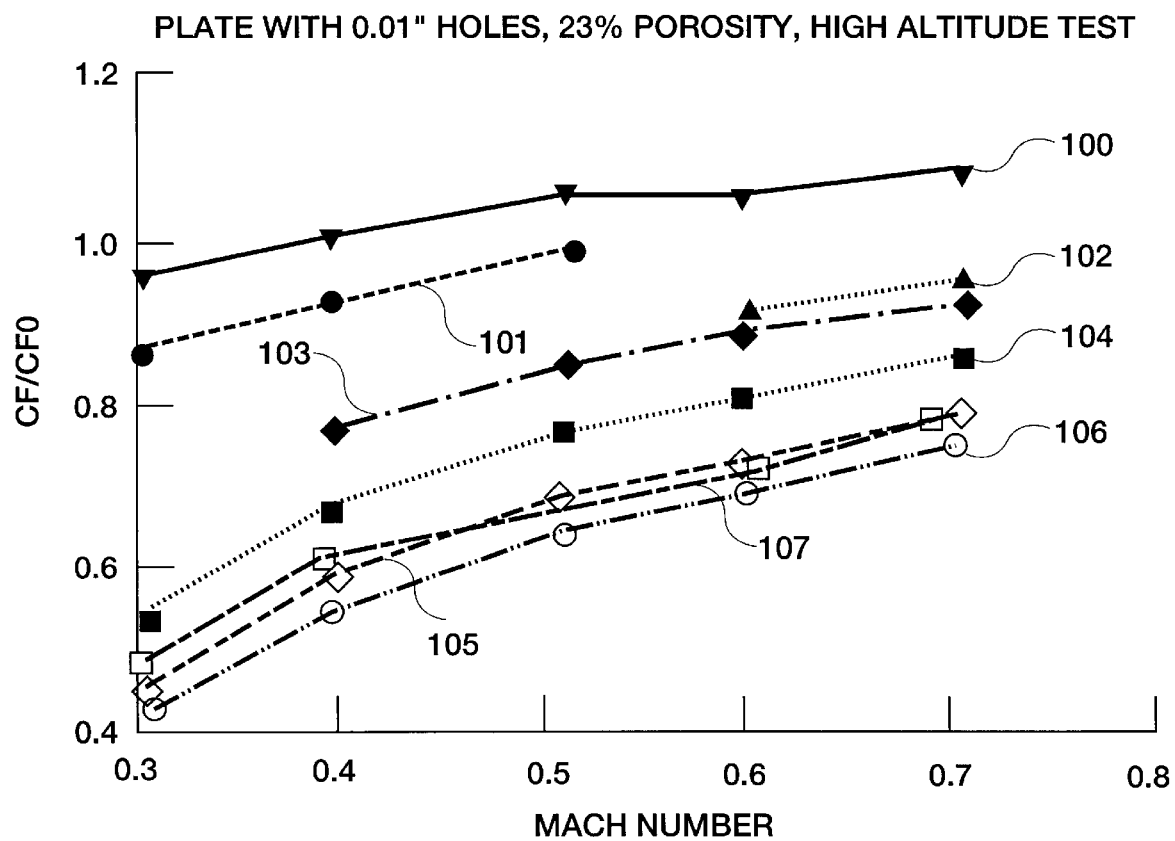
FIG. 12 shows skin friction coefficient ratios of another preferred embodiment of the invention.
Figure 13:
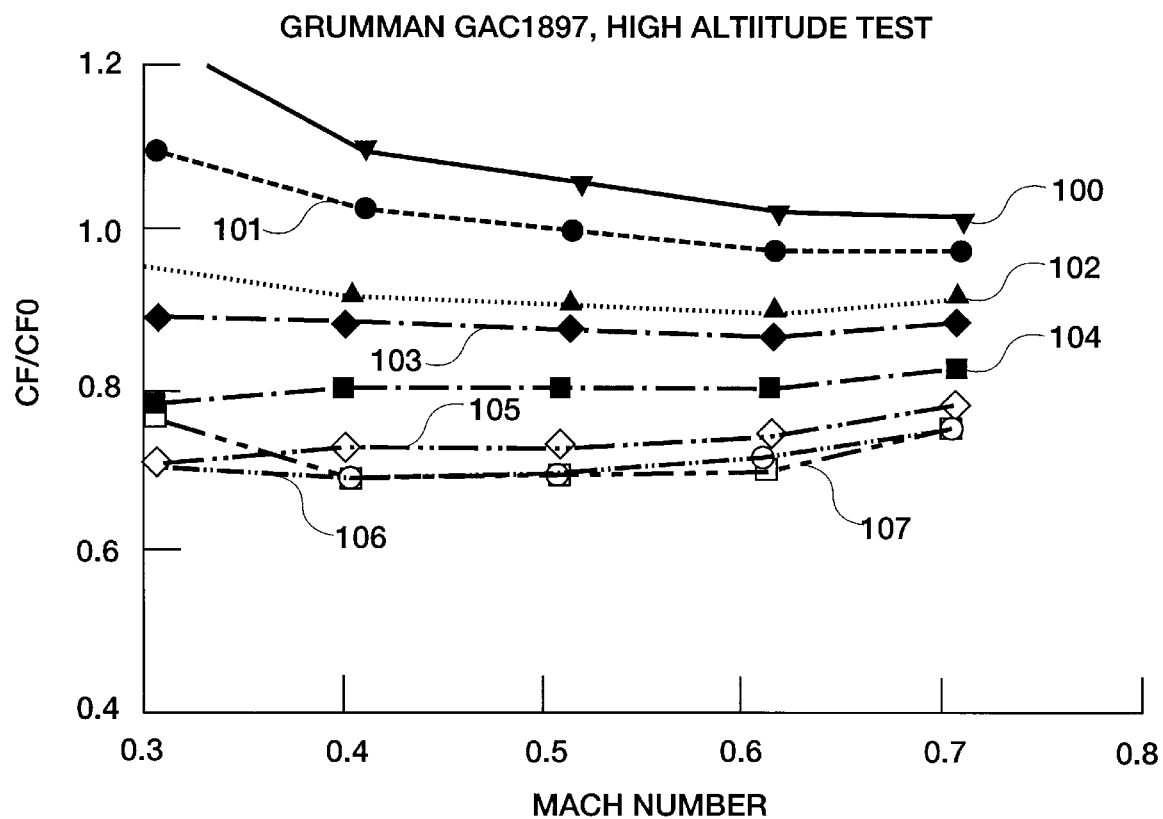
FIG. 13 shows skin friction coefficient ratios of yet another preferred embodiment of the invention.

FIGS. 12 and 13 indicate tests of further embodiments of the present invention that produced favorable results. FIG. 12 shows results of a plate with 0.01 inch diameter holes 34, 23% porosity, and an aspect ratio of 4.0. As with the plate with the 0.0065" holes, the greatest effects of the micro-blowing occur in the early stages of micro-blowing. It has yet to be determined what is the optimum blowing level, though increased transmitting yields diminishing returns. The maximum skin friction reduction was found at a transmitting rate of 0.036 lbm/sec/sq ft, line 106. Diminishing returns is shown by the fact that the greater transmitting rate, 0.042 lbm/sec/sq ft, line 107, did not yield increased skin friction reduction, but rather suggested that transmitting levels that are too great may cause the boundary layer to be blown off the skin 10 (see FIG. 1), causing increased skin friction.

FIG. 13 indicates the test results of a plate with 0.00236" holes, a 4% porosity, and an aspect ratio of 5.08. This plate offers skin friction reduction of up to 25% below that of a flat plate, with maximum skin friction reduction at the maximum level tested, 0.042 lbm/sec/sq ft, line 107.

Figure 14:
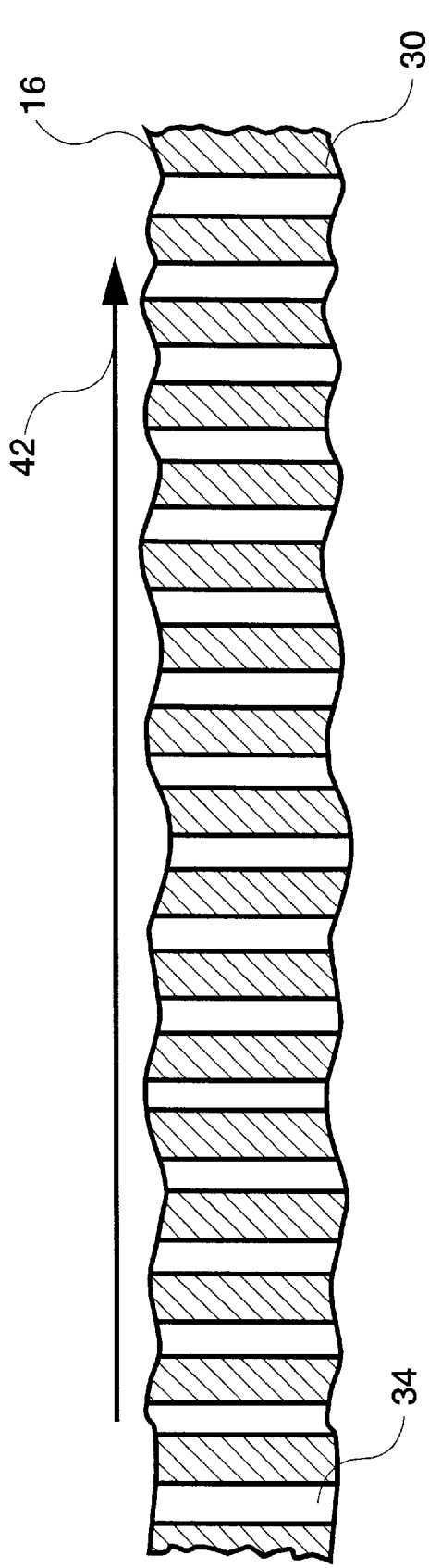
FIG. 14 is a schematic view of the surface without blowing.
Figure 15:
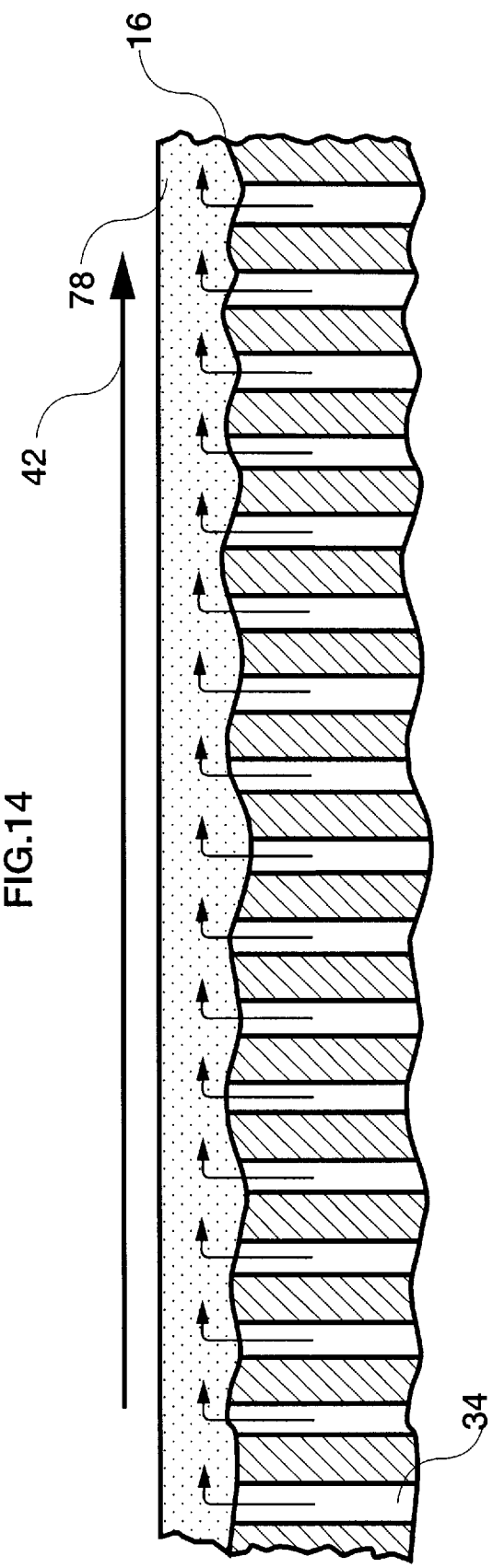
FIG. 15 is a schematic view of the surface with micro-blowing.

FIG. 14 is a schematic of the skin of outer layer 30. The outer surface 16 is rough and causes eddies in the passing airflow 42. FIG. 15 shows what happens during micro-blowing. Air blows through the holes 34, providing a cushion 78 between the rough outer surface 16 and the passing airflow 42. The cushion, therefore, helps reduce skin friction by preventing the passing airflow 42 from contacting the outer surface 16, and thus preventing the eddies that produce skin friction.

Figure 16:
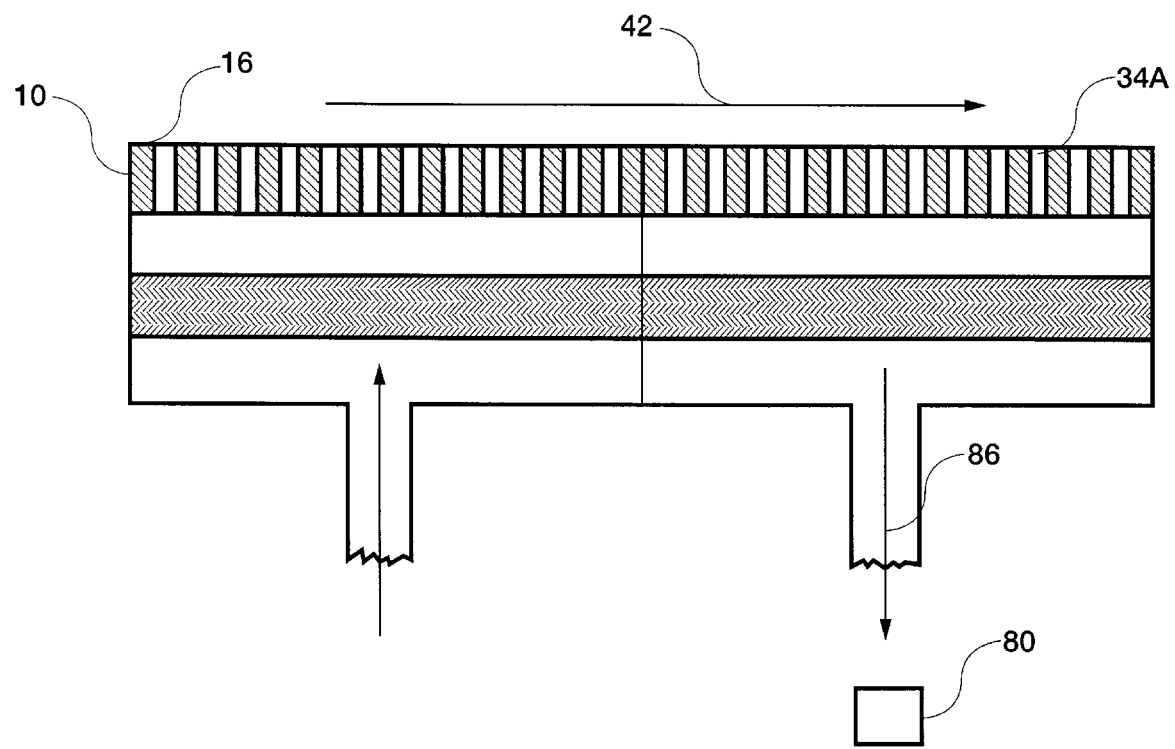
FIG. 16 shows a schematic of the still another embodiment of the invention utilizing the combination of micro-blowing and suction.

FIG. 16 illustrates a schematic of a further embodiment of the previous invention. As mentioned previously in the discussion of FIG. 8, the second fluid blown through the skin 10 may be suctioned or bled off of the outer surface 16 at a later time if the boundary layer between the first fluid mass and the skin of the craft grows too large. The outside flow 42 of the first fluid forces the second fluid blown onto the outer surface 16 to flow in the direction of the outside airflow 42. A vacuum or suctioning means 80 may then bleed the second fluid off of the outer surface 16, back through holes 34a in the outer layer in the direction of arrow 86. This will prevent the boundary layer from growing too large and peeling away from the skin 10. The second fluid may then be recycled by the micro-blower.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

I claim:

1. A system for reducing skin friction of an object in relative motion to an associated first fluid, said system comprising:

a skin, said skin having attachment means to an outer surface of said object and forming a boundary between said object and the first fluid, said skin having holes therethrough and through which a second fluid is blown; and transmitting means for transmitting said second fluid through said holes in said skin at a rate not more than 0.042 lbm/s/sq-ft.

2. The system for reducing skin friction of claim 1 wherein said skin has an inner layer and an outer layer.

3. The system of claim 2 wherein said inner layer is permeable.

4. The system of claim 2 wherein said inner layer is porous.

5. The system of claim 2 wherein said outer layer is porous.

6. The system for reducing skin friction of claim 5 wherein said outer layer comprises a plate having holes.

7. The system for reducing skin friction of claim 2 further comprising suction means for suctioning said second fluid from said outer layer.

8. The system of claim 2 wherein said inner layer controls a flow distribution of said second fluid to said outer layer.

9. The system of claim 1 wherein said skin has a porosity greater than 4%.

10. The system of claim 1 wherein one of said holes has an aspect ratio of greater than 4.0.

11. The system of claim 1 wherein one of said holes has a diameter between 0.002 inches and 0.015 inches.

12. The system for reducing skin friction of claim 1 wherein said attachment means of said skin is retrofittable to said object.

13. The system for reducing skin friction of claim 1 wherein said attachment means of said skin is manufactured as part of said object.

14. An article for use in relative motion to an associated first fluid, said article comprising:

a body, said body having a skin, said skin comprising an outer portion of said body and forming an interface between said article and the first fluid, said skin having holes through which a second fluid is transmitted; and, transmitting means for transmitting said second fluid through said holes in said skin at a rate not more than 0.042 lbm/s/sq-ft.

15. The article of claim 14 wherein said skin has an inner layer and an outer layer, said outer layer of said skin contacting said second fluid.

16. The article of claim 15 wherein said inner layer controls a flow distribution of said second fluid to said outer layer.

17. A method of reducing skin friction of an object in relative motion to a first fluid, said object comprising a skin, said skin having a porous outer layer, an inner layer, and transmitting means for transmitting a second fluid, said method comprising the steps of:

transmitting said second fluid through said inner layer at a rate not more than 0.042 lbm/s/sg-ft; and, passing said second fluid so transmitted through said inner layer through said outer layer.

18. The method of claim 17 wherein said object further comprises suction means for suctioning said second fluid from said outer layer to said inner layer, the method further comprising the step of bleeding said first fluid off of said outer layer using said suction means.

19. The method of claim 17 wherein said object further comprises suction means for suctioning said second fluid from said outer layer to said inner layer, the method further comprising the step of bleeding said second fluid off of said outer layer using said suction means.

* * * * *